United States Patent [19]

Zimmerman et al.

[11] Patent Number: 5,514,404

[45] Date of Patent: *May 7, 1996

[54] TENDERIZED BAKED GOOD PRODUCTION WITH REDUCED FAT, LOW FAT, OR NO ADDED FAT

[75] Inventors: Ellen L. Zimmerman, Morristown; Julia M. Carey, Madison; Louise Slade; Harry Levine, both of Morris Plains, all of N.J.

[73] Assignee: Nabisco, Inc., Parsippany, N.J.

[ * ] Notice: The term of this patent shall not extend beyond the expiration date of Pat. No. 5,514,387.

[21] Appl. No.: 351,059

[22] Filed: Nov. 29, 1994

[51] Int. Cl.$^6$ ..................................................... A23L 1/035
[52] U.S. Cl. ............................. 426/549; 426/19; 426/20; 426/661; 426/662; 426/654
[58] Field of Search .................................. 426/654, 661, 426/662, 549, 19, 20

[56] References Cited

U.S. PATENT DOCUMENTS

| | | |
|---|---|---|
| 4,396,635 | 8/1983 | Roudebush et al. . |
| 4,468,408 | 8/1984 | Bosco et al. . |
| 4,562,080 | 12/1985 | Tenn . |
| 4,668,519 | 5/1987 | Dartey et al. . |
| 4,678,672 | 7/1987 | Dartey et al. . |
| 4,904,485 | 2/1990 | Hirakawa et al. . |
| 5,080,921 | 1/1992 | Reimer . |
| 5,082,684 | 1/1992 | Fung . |
| 5,108,764 | 4/1992 | Craig et al. . |
| 5,120,561 | 6/1992 | Silva et al. . |
| 5,133,984 | 7/1992 | Murphy et al. . |
| 5,154,942 | 10/1992 | Hirschey et al. . |
| 5,160,759 | 11/1992 | Nomura et al. . |
| 5,176,927 | 1/1993 | Haarasilta et al. . |
| 5,254,356 | 10/1993 | Busken . |
| 5,362,502 | 11/1994 | Slade .......................................... 426/20 |

FOREIGN PATENT DOCUMENTS

WO91/18514  12/1991  WIPO .

OTHER PUBLICATIONS

Atwell, et al., *The Terminology and Methodology Associated with Basic Starch Phenomena*, Cereal Foods World, vol. 33, No. 2, pp. 306–311 (1988).

*Primary Examiner*—Helen Pratt

[57] ABSTRACT

Reduced fat, low fat and no-fat baked goods having a substantial amount of ungelatinized starch are produced by replacing a substantial portion of the shortening or fat of the dough with an emulsifier composition. The emulsifier composition increases the tenderness and softness of the baked good, and increases the air-holding capacity, the lubricity, lay time, and machinability of the dough, which would otherwise be diminished by the lower levels of oleaginous composition and higher levels of water. The emulsifier composition comprises: a) at least about 15% by weight, preferably from about 20% by weight to about 40% by weight of at least one polyoxyethylene sorbitan fatty acid ester, b) at least about 5% by weight, preferably from about 10% by weight to about 25% by weight of at least one lecithin, and c) at least about 20% by weight, preferably from about 35% by weight to about 70% by weight of at least one stearoyl lactylate. Polysorbate 60, fluidized soybean lecithin, and sodium stearoyl lactylate, represent the preferred combination of emulsifiers. Fermented crackers, such as saltine or soda crackers, unfermented crackers, cookies, and brownies having reduced fat, low-fat or no added fat may be produced in accordance with the present invention.

28 Claims, No Drawings

TENDERIZED BAKED GOOD PRODUCTION WITH REDUCED FAT, LOW FAT, OR NO ADDED FAT

FIELD OF THE INVENTION

The present invention relates to the tenderization and flavor enhancement of reduced fat, low-fat, and no-fat crackers and other baked goods made on a mass production, continuous basis.

BACKGROUND OF THE INVENTION

In the preparation of baked goods, fat lubricates and reduces viscosity of the dough. Fat retards starch from swelling, and from gelatinizing (including the second stage of gelatinization known as pasting). It also provides flavor and tenderness to the final product. Methods for making reduced fat, low-fat, or fat-free (no added fat) baked goods must somehow compensate for the multiple functions of fat when reducing or eliminating fat.

In producing crackers on a mass production basis, a cracker dough must be continuously sheetable, and it should preferably be capable of being laminated upon itself. The baked product should be non-brittle, so as to be transferable between conveyor belts and packaging equipment without excessive breakage.

Water can be used to reduce viscosity and to provide adequate lubrication to the dough in the absence of fat, but water cannot be used as the sole means to provide tenderness to the final product. Fat-free crackers made only with water as the fat replacement are flinty and so absorptive as to cause unpleasant dryness in the mouth upon eating.

As disclosed in U.S. Pat. No. 5,108,764 to Craig, et al., a major source of the textural problem in crackers is believed to be excessive gelatinization of starch in crackers made with extra water without adding fat. Excessive gelatinization of starch during baking makes the cracker flinty and very moisture-absorbent. Retention of water in the cracker dough during baking causes excessive gelatinization and the resultant inferior cracker. Thus, when preparing crackers, unlike preparing bread, starch gelatinization is to be limited. For example, in full-fatted crackers, 75% of the starch may be gelatinized. Removal of the fat may result in an increase of gelatinization to 85% or more, with a resultant cardboard-like texture.

In the process of U.S. Pat. No. 5,108,764, the added fat or shortening content of a mass-produced cracker is reduced using water and an enzyme composition that hydrolyzes non-cellulosic cell wall polysaccharides. The enzymatic treatment and the amount of water are such so as to avoid excessive gelatinization during baking.

The use of various emulsifier systems to reduce fat in foods is disclosed in International Publication No. WO 91 / 185 14, published Dec. 12, 1991, U.S. Pat. No. 5,254,356 to Busken, U.S. Pat. Nos. 4,678,672 and 4,668,5 19 to Dartey, et al., U.S. Pat. No. 5,080,921 to Reimer, U.S. Pat. No. 5,082,684 to Fung, U.S. Pat. No. 4,468,408 to Bosco, et al., U.S. Pat. No. 5,160,759 to Nomura, et al., and U.S. Pat. No. 5,154,942 to Hirschey, et al.

In the present invention, an emulsifier composition is used to provide an unexpectedly soft and tender texture and enhanced flavor to reduced fat, low-fat, and no-fat crackers and other baked goods which contain substantial amounts of ungelatinized starch. Dough lay times may be extended and dough machinability is not adversely affected, even though the added fat level is substantially reduced or completely eliminated.

SUMMARY OF THE INVENTION

In the present invention, the added fat or shortening content of a cracker is substantially reduced, using an emulsifier system to provide lubrication for machinability and to help reduce starch gelatinization. The emulsifier composition may be used to substantially reduce the fat content of other baked goods, such as cookies, which contain substantial amounts of ungelatinized starch. It may be advantageously used in baked goods where excessive gelatinization, resulting from fat reduction, adversely affects texture of the baked goods.

It is believed that the emulsifier composition causes gelatinization during baking to be retarded and limited, in the following way. The emulsifier composition complexes with amylose, which is mobilized and made available during the first stage of starch gelatinization. Amylose complexed with emulsifier is hindered from pasting during the second stage of gelatinization. Thus, the emulsifier composition retards the pasting of amylose, and thereby limits the overall extent of starch gelatinization during baking. This, in turn, eliminates the adverse effects on texture of baked goods such as crackers or cookies, which would otherwise result from excessive gelatinization in the presence of water during baking. Also, the emulsifier composition coats the flour particles, thereby providing lubrication, as did the fat which it replaces. Even though used in small amounts, the emulsifier composition interacts with the water to create a lubricating liquid phase. The lubricating effect of the emulsifier composition reduces the amount of water needed for obtaining a machinable dough, thereby also helping to reduce starch gelatinization.

Air entrapment and retention is also believed to be increased by the inclusion of the emulsifier system in the doughs of the present invention. Air entrapment and avoidance of excessive starch gelatinization by the use of the emulsifier system result in an unexpectedly tender-textured baked good. The unexpectedly soft, tender, non-brittle texture lasts for extended periods of time, for example, at least two months, preferably at least six months, in closed packaging. The emulsifier composition does not impart a soapy or off-flavor to the baked good. In preferred embodiments, cracker flavor is enhanced by the use of a natural cracker flavorant.

The reduced fat, low-fat, and no-fat cracker and other doughs or batters of the present invention contain effective emulsifying amounts of at least one of each of three emulsifier components: (1) polyoxyethylene sorbitan fatty acid esters, (2) lecithins, and (3) stearoyl lactylates. In preferred embodiments, the polyoxyethylene sorbitan fatty acid ester component is polysorbate 60, which is used with lecithin and sodium stearoyl lactylate. The amount of polysorbate 60 and/or other polyoxyethylene sorbitan fatty acid ester components may be at least about 15% by weight, preferably from about 20% by weight to about 40% by weight. The amount of lecithin may be at least about 5% by weight, preferably from about 10% by weight to about 25% by weight. The amount of sodium stearoyl lactylate and/or other stearoyl lactylates may be at least about 20% by weight, preferably from about 35% by weight to about 70% by weight. The percentages of the three emulsifier components, such as polysorbate 60, lecithin, and sodium stearoyl lactylate, add up to 100% by weight.

The three emulsifier components, such as polysorbate 60, lecithin, and sodium stearoyl lactylate, may be premixed and then mixed with the flour, or they may be separately admixed with the flour. In preferred embodiments, the polysorbate 60 is present in or premixed with a natural flavorant, and then the premix is admixed with the flour. The total amount of the three emulsifier components, such as polysorbate 60, lecithin, and sodium stearoyl lactylate, may range from about 0.5% by weight to about 1.5% by weight of the flour used to form the machinable dough.

In preferred embodiments of the invention for making crackers, an enzyme composition having activities for hydrolyzing non-cellulosic cell wall polysaccharides, such as a pentosanase or xylanase enzyme composition, is included in the cracker dough to reduce starch gelatinization.

The crackers produced in accordance with the present invention may be chemically leavened or unfermented reduced fat, low-fat, or no-fat crackers. Fermented crackers, such as soda crackers, having reduced fat, low-fat or no added fat may also be produced in accordance with the present invention.

DETAILED DESCRIPTION OF THE INVENTION

The fat content of a cracker or cookie or other baked goods which normally have a substantial amount of ungelatinized starch is reduced in accordance with the present invention by replacing a substantial portion of the shortening or fat of the dough with an emulsifier composition. The emulsifier composition increases the tenderness and softness of the baked good and increases the air-holding capacity, the lubricity, lay time, and machinability of the dough, which would otherwise be diminished by the lower levels of oleaginous composition and higher levels of water. In embodiments of the invention, baked goods in which about 15% or more of the starch is ungelatinized may have their fat content substantially reduced or even eliminated, without substantially adversely affecting dough machinability or baked-good texture, appearance, taste, and shelf-life. In preferred embodiments, the percentage of ungelatinized starch approaches or is substantially the same as that of the full-fatted product.

By interacting with water, the emulsifier composition provides a liquid phase which provides lubricity and air-entrapment capability to the dough. It also helps to reduce excessive starch gelatinization during baking. This avoids a hard, flinty texture in the relatively low moisture-content baked product. The emulsifier composition does not impart a soapy or off-flavor to the baked good, and it does not produce an excessively blistered surface. The unexpectedly soft, tender, non-brittle texture is exhibited for at least two months, preferably at least six months, in proper, air-tight packaging.

Generally, starch gelatinization occurs when: a) water in a sufficient amount, generally at least about 25 to 30% by weight, based upon the weight of the starch, is added to and mixed with starch and, b) the temperature of the starch-water mixture is raised to at least about 80° C. (176° F.), preferably 100° C. (212° F.) or more. The gelatinization temperature depends upon the amount of water available for reaction with the starch. The lower the amount of available water, generally, the higher the gelatinization temperature. Gelatinization may be defined as the collapse (disruption) of molecular order within the starch granule, manifested in irreversible changes in properties such as granular swelling, native-crystallite melting, loss of birefringence, and starch solubilization. The point of the initial stage of gelatinization and the range over which it occurs are governed by starch concentration, method of observation, granule type, and heterogeneities within the granule population under observation. Pasting is the second-stage phenomenon following the first stage of gelatinization in the dissolution of starch. It involves increased granular swelling, exudation of molecular components (i.e. amylose, followed by amylopectin) from the granule, and eventually, total disruption of the granule. See Atwell et al, "The Terminology And Methodology Associated With Basic Starch Phenomena," *Cereal Foods World,* Vol. 33, No. 3, Pgs. 306–311 (March 1988).

The emulsifier composition, it is believed, complexes with amylose, which is mobilized and made available during the first stage of starch gelatinization. In the second stage of gelatinization, or during pasting, the amylose is hindered from pasting because it is complexed with the emulsifier composition. As a result, the overall extent of starch gelatinization is hindered by the formation of the complex or complexes. Adverse effects on texture of baked goods which would otherwise result from excessive gelatinization in the presence of water during baking are thereby avoided.

As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers used as snacks and for cookies, the reference amount is 30 grams. Thus, the fat content of a low-fat cracker or cookie would therefore be less than or equal to 3 grams of fat per 50 grams or less than or equal to about 6% fat, based upon the total weight of the final product. A no-fat accompaniment cracker would have a fat content of less than 0.5 grams per 15 grams or less than about 3.33%, based upon the weight of the final product.

Oleaginous compositions which may be used to obtain the reduced-fat or low-fat baked goods of the present invention may include any known shortening or fat blends or compositions useful for baking applications, and they may include conventional food-grade emulsifiers. Vegetable oils, lard, marine oils, and mixtures thereof, which are fractionated, partially hydrogenated, and/or interesterified, are exemplary of the shortenings or fats which may be used in the present invention. Edible reduced- or low-calorie, or non-digestible fats, fat-substitutes, or synthetic fats, such as sucrose polyesters, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions for use in the present invention comprise soybean oil.

In the present invention, a three-component emulsifier system is used to replace a portion or all of the oleaginous composition. The emulsifier combination utilized in the present invention provides an unexpectedly superior, soft and tender texture to reduced-fat, low-fat, and no-fat baked goods having substantial amounts of ungelatinized starch and relatively low moisture contents. The three components of the emulsifier system are: 1) at least one polyoxyethylene sorbitan fatty acid ester, 2) at least one lecithin, and 3) at least one stearoyl lactylate.

Exemplary of the polyoxyethylene sorbitan fatty acid esters which may be used are water-soluble polysorbates such as polyoxyethylene (20) sorbitan monostearate (polysorbate 60), polyoxyethylene (20) sorbitan monooleate (polysorbate 80), and mixtures thereof. Polysorbate 60 is preferred.

Polysorbate 60, polyoxyethylene (20) sorbitan monostearate, is a hydrophilic emulsifier which is a mixture of stearate and palmitate partial esters of sorbitol and sorbitol anhydrides condensed or copolymerized with approximately 20 moles of ethylene oxide ($C_2H_4O$) for each mole of sorbitol and its mono- and dianhydrides. It is a lemon- to orange-colored, oily liquid or semi-gel having a faint, characteristic odor and a warm, somewhat bitter taste. It is soluble in water, aniline, ethyl acetate, and toluene, but is soluble only at low levels in mineral and vegetable oils. Polysorbate 60 is commercially available under the trademark Tween 60 from ICI-Atlas.

Polysorbate 80, polyoxyethylene (20) sorbitan monooleate, is a hydrophilic emulsifier which is a mixture of oleate partial esters of sorbitol and sorbitol anhydrides condensed or copolymerized with approximately 20 moles of ethylene oxide ($C_2H_4O$) for each mole of sorbitol and its mono- and dianhydrides. It is a yellow- to orange-colored, oily liquid having a faint, characteristic odor and a warm, somewhat bitter taste. It is very soluble in water, producing an odorless, nearly colorless solution, and is soluble in ethanol, cottonseed oil, corn oil, methanol, ethyl acetate and toluene. Polysorbate 80 is commercially available under the trademark Tween 80 from ICI-Atlas.

Lecithin, or phosphatidylcholine, is a phosphatide found in all living organisms (plants and animals). Lecithin is a mixture of the diglycerides of stearic, palmitic, and oleic acids, linked to the choline ester of phosphoric acid. Examples of natural lecithins which may be used include those derived from plants such as soybean, rapeseed, sunflower, or corn, and those derived from animal sources such as egg yolk. Soybean-oil-derived lecithins are preferred.

Commercially available lecithin is preferred for use in the present invention. Commercial grades generally contain about 2.2% phosphorus. Lecithin is prepared commercially primarily from soybean oil. It exists preformed as a contaminant in crude soybean oil, and the commercial method of preparation involves precipitation from the oil and subsequent purification. It may be further processed by bleaching, fractionation, hydrolysis, acetylation, extraction, hydroxylation, and the like. Soybean lecithin may contain about 11.7% palmitic acid, about 4% stearic acid, about 8.6% palmitoleic acid, about 9.8% oleic acid, about 55% linoleic acid, about 4% linolenic acid, and about 5.5% $C_{20}$ to $C_{22}$ acids, including arachidonic acid.

Commercial grades of lecithin are classed according to total phosphatides, color, and fluidity. The amount of phosphatides in commercial lecithin generally ranges between about 54% and about 72%. The product specifications usually report the concentration of phosphatides as "per cent acetone-insolubles." Color is stated as unbleached, single bleached, and double bleached. The bleaching process tends to reduce the effectiveness of the lecithin as a surface-active material. The consistency will be "plastic" or "fluid".

Lecithin is available as a regular waxy solid or as "fluid," a molasses-like syrup. Fluidization may be attained by addition of 2–5% fatty acids and/or by mechanical means. The lecithin is a waxy mass when the acid value is about 20. It is a pourable, thick fluid when the acid value is around 30. The color of lecithin is nearly white when freshly made, but rapidly becomes yellow to brown in air. It may have an iodine value of about 95% and a saponification value of about 196. Lecithin is insoluble but swells in water and in NaCl solution, forming a colloidal suspension.

In preferred embodiments of the present invention, commercially available, fluidized, soybean-oil-derived lecithin is employed. Exemplary of a preferred fluid lecithin is an unbleached lecithin, derived from the phosphatides of phospholipids of soybean oil, which is semi-solid but pourable at room temperature. The Brookfield viscosity at 77° F. of the oil-based product may be about 5500 (±200) cps, and it may be light tan to yellow in color. The moisture content of the fluid lecithin may be less than or equal to 1% by weight, and its acetone-insoluble matter (phosphatides) may be at least 62% by weight. The hexane-soluble matter may be 0.3% by weight maximum, and the acid value may be 32 maximum.

Exemplary of the stearoyl lactylate component are alkali and alkaline-earth stearoyl lactylates such as sodium stearoyl lactylate, calcium stearoyl lactylate, and mixtures thereof. Sodium stearoyl lactylate is preferred.

Each of the three emulsifier components is used in an effective emulsifying amount. The total amount of the polyoxyethylene sorbitan fatty acid ester component, such as polysorbate 60, polysorbate 80, and mixtures thereof, may be at least about 15% by weight, preferably from about 20% by weight to about 40% by weight, based upon the total weight of the three emulsifier components.

The total amount of the lecithin component should be at least about 5% by weight, preferably from about 10% by weight to about 25% by weight, based upon the total weight of the three emulsifier components. If the amount of lecithin is too low, excessive blistering has been found to occur in the production of crackers.

The total amount of the stearoyl lactylate component, such as sodium stearoyl lactylate and/or calcium stearoyl lactylate, may be at least about 20% by weight, preferably from about 35% by weight to about 70% by weight, based upon the total weight of the three emulsifier components.

The three emulsifier components, such as the preferred three components, polysorbate 60, soybean lecithin, and sodium stearoyl lactylate, may be incorporated into the dough separately or as a premix. They are preferably separately added to the flour. The three emulsifier components may be used in a total amount of from about 0.5% by weight to about 1.5% by weight of the total amount of flour used to form the machinable dough or batter.

The emulsifier components may be premixed with, or present in, other dough or batter ingredients, such as a flavorant. In preferred embodiments, a natural flavorant is premixed with polysorbate 60, wherein the polysorbate 60 serves as a carrier, alone or with other carriers, for the flavorant to enhance flavor of the baked product. The polysorbate may, for example, amount to about 20–35% by weight of the total flavorant composition.

The flour component or farinaceous materials may be any comminuted cereal grain or edible seed or vegetable meal, derivatives thereof and mixtures thereof. Exemplary of the flour component or farinaceous materials which may be used are wheat flour, corn flour, corn masa flour, oat flour, barley flour, rye flour, rice flour, potato flour, grain sorghum flour, tapioca flour, graham flour, or starches, such as corn starch, wheat starch, rice starch, potato starch, tapioca starch, physically and/or chemically modified flours or starches, such as pregelatinized starches, and mixtures thereof. The flour may be bleached or unbleached. Wheat flour or mixtures of wheat flour with other grain flours are preferred. The amount of flour used in the compositions of the present invention ranges, for example, from about 30% by weight to about 80% by weight, preferably from about 45% by weight to about 75% by weight, based upon the weight of the dough. Unless otherwise indicated, all weight percentages are based upon the total weight of all ingredients forming the doughs or formulations of the present invention, except for inclusions such as flavor chips, nuts, raisins, and the like. Thus, "the weight of the dough" does not include the weight of inclusions.

The flour may be replaced in whole or in part by flour substitutes or bulking agents, such as polydextrose, hollocellulose, microcrystalline cellulose, mixtures thereof, and the like. Corn bran, wheat bran, oat bran., rice bran, mixtures thereof, and the like may also be substituted in whole or in part for the flour, for making a fiber-enriched product, to enhance color, or to affect texture.

Corn flour and/or wheat bran may be used, for example, to enhance color and affect texture. Exemplary amounts range up to about 15% by weight corn flour and up to about 20% by weight wheat bran, the percentages being based upon the total weight of ingredients forming the dough. In preferred embodiments of the invention, the corn flour and wheat bran may each comprise from about 1 to about 10% by weight, based upon the weight of the dough.

Process-compatible ingredients, which can be used to modify the texture of the products produced in the present invention, include sugars such as sucrose, fructose, lactose, dextrose, galactose, maltodextrins, corn syrup solids, hydrogenated starch hydrolysates, protein hydrolysates, glucose syrup, mixtures thereof, and the like. Reducing sugars, such as fructose, maltose, lactose, and dextrose, or mixtures of reducing sugars may be used to promote browning. Fructose is the preferred reducing sugar, because of its ready availability and its generally more enhanced browning and flavor-development effects. Exemplary sources of fructose include invert syrup, high fructose corn syrup, molasses, brown sugar, maple syrup, mixtures thereof, and the like.

The texturizing ingredient, such as sugar, may be admixed with the other ingredients in either solid or crystalline form, such as crystalline or granulated sucrose, granulated brown sugar, or crystalline fructose, or in liquid form, such as sucrose syrup or high fructose corn syrup. In embodiments of the invention, humectant sugars, such as high fructose corn syrup, maltose, sorbose, galactose, corn syrup, glucose syrup, invert syrup, honey, molasses, fructose, lactose, dextrose, and mixtures thereof, may be used to promote chewiness in the baked product.

In addition to the humectant sugars, other humectants, or aqueous solutions of humectants which are not sugars or possess a low degree of sweetness relative to sucrose, may also be employed in the dough or batter. For example, glycerol, sugar alcohols such as mannitol, maltitol, xylitol and sorbitol, and other polyols, may be used as humectants. Additional examples of humectant polyols (i.e. polyhydric alcohols) include glycols, for example propylene glycol, and hydrogenated glucose syrups. Other humectants include sugar esters, dextrins, hydrogenated starch hydrolysates, and other starch hydrolysis products.

In embodiments of the present invention, the total sugar solids content, or the texturizing ingredient content, of the doughs of the present invention may range from zero up to about 50% by weight, based upon the weight of the dough.

The moisture contents of the doughs of the present invention should be sufficient to provide the desired consistency to enable proper forming, machining, and cutting of the dough. The total moisture content of the doughs of the present invention will include any water included as a separately added ingredient, as well as the moisture provided by flour (which usually contains about 12% to about 14% by weight moisture), and the moisture content of other dough additives included in the formulation, such as high fructose corn syrup, invert syrups, or other liquid humectants.

Taking into account all sources of moisture in the dough or batter, including separately added water, the total moisture content of the doughs or batters of the present invention is generally less than about 50% by weight, preferably less than about 35% by weight, based upon the weight of the dough or batter. The cracker doughs of the present invention generally have a moisture content of about 27% by weight to about 33% by weight, based upon the weight of the dough. Cookie doughs of the present invention may have a moisture content of less than about 30% by weight, generally from about 10% by weight to about 20% by weight, based upon the weight of the dough.

Preferably, minimal amounts of water are used to form the dough, so as to limit starch gelatinization. In embodiments of the present invention, the water content of a reduced-fat, low-fat, or no-fat dough may be reduced: a) without substantially increasing the viscosity or consistency of the dough, and b) without substantially increasing the gelatinization of the starch, compared to the reduced-fat, low-fat, or no-fat dough which does not contain the emulsifier system. Exemplary reductions in the dough water content may range from about 4% by weight to about 15% by weight of the water used in the dough without the emulsifier system. In embodiments of the invention, the water content of the dough may be reduced, the same or increased, compared to that of the dough containing unreplaced shortening or fat.

In addition to the foregoing, the doughs of the invention may include other additives conventionally employed in crackers and cookies. Such additives may include, for example, milk by-products, egg or egg by-products, cocoa, vanilla or other flavorings, as well as inclusions such as nuts, raisins, coconut, flavored chips such as chocolate chips, butterscotch chips and caramel chips, and the like in conventional amounts.

A source of protein, which is suitable for inclusion in baked goods, may be included in the doughs of the present invention to promote Maillard browning. The source of protein may include non-fat dry milk solids, dried or powdered eggs, mixtures thereof, and the like. The amount of the proteinaceous source may, for example, range up to about 5% by weight, based upon the weight of the dough.

The dough compositions of the present invention may contain up to about 5% by weight of a leavening system, based upon the weight of the dough. Exemplary of chemical leavening agents or pH-adjusting agents which may be used include alkaline materials and acidic materials such as sodium bicarbonate, ammonium bicarbonate; calcium acid phosphate, sodium acid pyrophosphate, diammonium phosphate, tartaric acid, mixtures thereof, and the like. Yeast may be used alone or in combination with chemical leavening agents.

A calcium component, preferably calcium carbonate, may be included in the reduced fat, low-fat, and no-fat doughs of the present invention to obtain calcium enriched baked products having more than 10%, preferably at least 20% of the U.S.R.D.A. of 1000 mg of calcium per 15 gram serving as disclosed in copending, commonly assigned U.S. application No. 08/350,084, for "CALCIUM ENRICHED BAKED GOOD PRODUCTION" filed on Nov. 29, 1994, in the names of Ellen L. Zimmerman, Julia M. Carey, Louise Slade, and Harry Levine, which application is incorporated herein by reference in its entirety.

In embodiments of the present invention, enzymatic treatment may be used to alter the water-holding non-cellulosic, cell-wall polysaccharides such as pentosans and/or betaglucans in the dough environment. Pentosans, for example, hold a lot of water, even though they amount to only a minor fraction of the dough. Hydrolyzing the pentosans, or other hemicelluloses so they permit release of water from the dough before the starch gelatinization temperature is reached during baking, helps to lower the amount of gelatinization of starch. Water released from the pentosans, but not from the dough during baking, may interact with the emulsifier composition. This may contribute to, or provide a portion of, the liquid phase which lubricates the dough and entraps air.

The enzymes may be used at temperatures and pH conditions normally recommended by their manufacturers, or at conditions which are optimal for pentosanase or other hemicellulase activities. The enzymes may be acidic, neutral, or alkaline. Exemplary commercially available enzyme preparations which may be used in the present invention are: (1) PEN #3 Liquid Concentrate; manufactured by Quest International Bioproducts Group, 1833 57th Street, Sarasota, Florida, and 2) Multifect XL and Cytolase 123 (also known as GC123), manufactured by Genencor, Inc., 180 Kimball Way, South San Francisco, Calif. 94080. These enzyme preparations are cellulases from the microorganism *Trichoderma reesei*, which possess powerful pentosan-degrading activity. They are believed to comprise endo-cellulase, betaglucanase, pentosanase, and beta-glucosidase. According to Genencor literature, when GC123 is evaluated in cereal grain applications, the enzyme should be added at about 0.2 percent w/w based on grain. It is indicated that, in many applications, this dosage can be substantially reduced. It is further indicated that optimal operating pH for the important activities in GC123 is generally centered around pH 4.8, and that considerable flexibility exists. Typically, it is reported, pH adjustment is not required when treating cereal grains suspended in tap water (pH approximately 6.2). According to the Genencor literature, optimal activity is generally found at about 50° to 60° C. (122° to 140° F.). The enzymes, it is stated, are also active at lower temperatures, but work less quickly. Higher temperatures (to approximately 70° C.) may be used for short incubation times, but the activity is soon lost due to thermal inactivation.

The pentosanase content of hemi-cellulase enzymes is preferably measured as xylanase units of activity (XAU). The assay principle is this: xylanase activity is determined by the manufacturer with a simple colorimetric assay. A commercially available, soluble, dyed xylan is hydrolyzed, and the small molecular weight fragments are not precipitated by ethanol, leaving a colored supernatant. Xylanase activity of PEN #3 concentrate, for example, is about 10,250±750 XAU/ml. Exemplary amounts of the enzyme composition used in the present invention may range from about 200 to about 1500 XAU/lb flour, preferably from about 900 to about 1300 XAU/lb flour.

The enzyme may be added in liquid or powdered form. Liquid forms which have been diluted with water are preferred for facilitation of homogeneous distribution throughout the dough. Exemplary amounts of the enzyme composition used in the present invention, presented in aqueous solution, may be about 0.1% by weight to about 0.4% by weight of solution, based on the total weight of the flour. The enzyme solution may be prepared by admixing about 1 part by weight of enzyme concentrate with about 9 parts by weight of water.

Enzymes have optimal environments in which they function best. Care should be taken, with regard to enzyme treatment, to create a suitable environment for the enzyme. The pH of certain leavening agents is high, so they preferably should not be admixed with the enzyme in a concentrated manner. For example, in producing an unfermented cracker, the leavening agent is preferably well dispersed with the other ingredients, prior to the addition of the enzyme.

The machinable no-fat, low-fat, and reduced-fat doughs of the present invention are continuously sheetable using counter-rotating rolls. The cracker dough sheet can be continuously laminated upon itself to form from 3 to 8 laminae, for example. The laminated cracker doughs are capable of being reduced in thickness by counter-rotating rolls, to obtain a sheet which may be cut into pieces by reciprocating or rotary cutters, for example. Plastic cutters, such as nylon or polycarbonate cutters, or plastic-coated steel cutters, such as teflon-coated steel cutters, may be used to reduce dough adherence. Conventional cracker manufacturing equipment, such as gauge rollers, laminators, and cutters, may be used in the present invention.

The fat-reduced cookie doughs may be sheeted by counter-rotating rollers and cut into pieces by rotary or reciprocating cutters. The cookie doughs may also be formed into pieces by wire-cutting or rotary-molding.

In embodiments of the present invention, the machinable no-fat, low-fat, and reduced-fat or shortening-content doughs may have an LFRA value of about 100 grams to about 1200 grams, preferably from about 400 grams to about 800 grams. LFRA is an acronym for Leatherhead Food Research Association, the manufacturer of a texture analyzer. As used herein, the LFRA value represents the resistance of the dough to deformation by a 0.5"-diameter ball probe moving at a constant rate of 2 millimeters per second for a set distance of 15 millimeters into the dough.

The baked products of the present invention have a relative vapor pressure ("water activity") of less than about 0.7, preferably less than about 0.6, to assure microbial shelf-stability. The water content of the cracker products is generally less than about 6% by weight, for example, from about 0.25% by weight to about 4% by weight, based upon the weight of the baked product, exclusive of inclusions. Cookie, brownie and cake products generally have a moisture content of less than about 20% by weight, for example, from about 2% by weight to about 9% by weight for cookies, based upon the weight of the baked product, exclusive of inclusions. Starch gelatinization (measured by differential scanning calorimetry) in the baked products of the present invention may generally be less than about 80% for crackers and less than about 10% for cookies.

Fermented Cracker Production

Fat-free, reduced-fat, and low-fat fermented crackers are produced using a sponge stage and a dough-up stage. The basic ingredients in the preparation of a sponge are flour and water. The fermentation agents are yeast and bacteria. The yeast, flour, and the surfaces of the trough in which the sponge is formed can serve as sources of microflora. It is preferable to use a starter or inoculum from a previous batch of sponge to serve as a source of bacteria. A sponge flour is generally relatively strong, unbleached, with an ash content of 0.39 to 0.49%. It may have a protein content of about 7.5 to 13.0% and an acid viscosity value in the range of about 60° to 90° M. A sponge may be produced by combining the flour, water, yeast, and bacterial source in a mixer, such as a spindle mixer or upright mixer.

It is preferable to add all of the water in the sponge-forming stage, to avoid an extra step in the dough-forming stage. However, a portion of the water may be added to the sponge in the dough-forming stage, in a manner which avoids disturbing the substantially uniform distribution of the leavening agents.

Exemplary relative amounts of the ingredients, which may be used in the formation of the sponge, are from about 60 to about 70% by weight flour, from about 25 to about 35% by weight water, from about 0.05 to about 1% by weight yeast, from about 0 to about 2% by weight diastatic malt or proteolytic enzyme, from about 0 to about 2% by weight yeast food, from about 0 to about 3% by weight of cracker meal, and from about 0 to about 2% by weight of starter or ferment. All percentages are based upon the total weight of the ingredients used to form the sponge. Known buffers can be added as needed to obtain a pH of about 5 to about 6.5 at the start of the fermentation. Various flours can be used, such as wheat, oat, rice, graham and mixtures thereof, but wheat flour or mixtures thereof with one or more other flours are preferred.

Fermentation times (also referred to herein as sponge times) are those conventionally used in the art. In the case of soda crackers or saltines, and the many variants of these products, such as oyster (soup) crackers, club crackers, cheese crackers, and the like, sponge times of about 2 to 24 hours are typically used.

In preparing the sponge, no special order of mixing is required. Conventional processes can be used. Generally, the flour is dumped into a trough, a portion of the water containing dispersed yeast and buffer is added, the remaining ingredients of the sponge are added, and then the balance of the water is added. The sponge ingredients are mixed until substantial homogeneity is achieved.

When doughing-up the sponge, dough ingredients for mixing into the fermented sponge generally include flour and sodium bicarbonate. In producing reduced-fat or low-fat crackers, the shortening or fat may also be added in the dough-up stage. The addition of fat or shortening in the preparation of the sponge may decrease fermentation activity. Minor amounts of water, sodium chloride, and ammonium bicarbonate may be added in the dough-up stage. A calcium component, preferably calcium carbonate may be added in the dough-up stage for producing calcium enriched reduced fat, low-fat, or no-fat crackers which provide more than 10%, preferably at least 20%, of the U.S.R.D.A. of 1000 mg of calcium per 15 gram serving as disclosed in said copending, commonly assigned U.S. application No. 08/350,084, for "CALCIUM ENRICHED BAKED GOOD PRODUCTION" filed on Nov. 29, 1994, in the names of Ellen L. Zimmerman, Julia M. Carey, Louise Slade, and Harry Levine. It is preferable to include all of the water as an ingredient of the sponge. The dough-up flour may generally be weaker than the sponge flour, and may typically have an ash content of about 0.45%, and an acid viscosity value of about 40° to 60° M. Wheat flour and mixtures thereof with at least one other flour are preferred.

The relative amounts of the sponge ingredients to the dough ingredients may generally be such that the weight-percent of flour used to form the sponge is from about 60% to about 75% by weight of the total amount of flour which is used.

The emulsifiers used in the present invention are added in the dough-up stage, so as to ensure maximum fermentation. The liquid or "wet" emulsifiers, such as fluidized lecithin and polysorbates, are preferably added on the surface of the sponge, prior to flour addition. Keeping the "wet" ingredients in contact with the sponge minimizes lumping, as could otherwise occur if these ingredients were added on top of the flour in the dough-up stage. The stearoyl lactylates may be added on top of the dough-up flour, along with other dry ingredients such as salt and leavening agents.

Hemicellulases may be added during sponge preparation, during sponge fermentation, or at a later time. However, adding the hemicellulase at dough-up is preferred, to avoid the possibility of interference with the sponge-fermentation process. For example, pentosanase is preferably added to the surface of the sponge, in a solution for even dispersion and avoidance of lumping, prior to flour addition. When, for example, pentosanases are used which work best at pH's of about 4.5 or 5, alkaline leavening agents, e.g. sodium bicarbonate, preferably should be maintained separate from the pentosanases for as long as possible, to obtain consistently optimal results.

The dough-up ingredients and the sponge are then mixed to obtain a dough of substantial homogeneity. After mixing, the dough is proofed, or allowed to ferment further, as is conventional in the cracker art. The viscosity of the dough is also decreasing during this time. Typical proofing times range from about 2 hours to about 5 hours, most typically about four hours. Generally, the temperature of the sponge before doughing, the temperature of the dough after doughing, and the temperature of the dough at the dough-forming machine are substantially the same.

The proofed dough is machined and baked in the conventional manner for the preparation of fermented crackers. Soda crackers, for example, may be formed from a continuous sheet of dough which is laminated or lapped before being cut. The dough pieces are formed by a stamping device, such as a reciprocating cutter or rotary cutter, which does not entirely sever the individual crackers from the sheet. The crackers remain in a substantially continuous sheet through the band oven. The cutter may also puncture the dough pieces to form docker holes for the prevention of uneven or excessive expansion in the oven. After baking, the individual crackers are separated from the substantially continuous sheet. The optional topping salt is generally applied after stamping and before baking.

The baked product is generally dried during the baking step or in a subsequent drying step to a moisture content of about 2% to about 4% by weight, based upon the final weight of the cracker.

A problem may arise with the shelf-life of fat-free crackers. They can go rancid more rapidly than crackers made with fat. This is believed to be because fat or shortening retards oxygenation and peroxide formation at points of unsaturation in naturally occurring grain lipids. Lipids are naturally present in grains such as wheat and wheat products such as flour. It is these lipids which can go rancid when fat-free crackers are made. At some point in the process, an antioxidizing agent such as naturally occurring anti-oxidants, including citric acid or tocopherols, or BHT, BHA or TBHQ, or mixtures thereof, can be added to prevent rancidity.

Unfermented Cracker Production

In preparing no-fat, low-fat, and reduced-fat, unfermented crackers by the method of the present invention, the ingredients used may be basically the same as when preparing fermented crackers, except that no yeast or bacteria is employed. Thus, the ingredients of the dough may comprise flour, water, optional shortening or fat, sodium bicarbonate and a food-grade acidic compound to effect leavening. Proteolytic, amylolytic, and pentosanase enzymes may be used. The flour used in unfermented crackers does not generally need to be as strong as the sponge flour used in fermented crackers, although the flour should be moderately strong. Advantageously, the dough used to prepare the unfermented crackers comprises malt.

In addition to the aforementioned ingredients, doughs used to prepare unfermented crackers of the snack type by the method of the present invention may contain one or more sugars. For example, the sugar may be added as a mixture of sucrose with at least one humectant sugar, such as high fructose corn syrup, corn syrup, or glucose syrup. Exemplary amounts of the sugars used per 100 parts by weight of flour in the dough may be from about 4 to about 12 parts by weight of sucrose and from about 1 to about 5 parts by weight of one or more humectant sugars.

When producing unfermented crackers by the method of the present invention, the conventional mixing steps of a creaming stage followed by a dough-up stage may be employed. In the creaming stage, all the ingredients, including the emulsifiers of the present invention, may, for example, be creamed, except for the wheat flour, leavening agents, liquid pentosanase, and a portion of the water. In the dough-up stage, the flour may be added, followed by the leavening agents and optional enzymes, added, with the remaining water on top of the flour. To ensure uniform distribution of the minor ingredients throughout the dough, the flour added in the dough-up stage is preferably distributed substantially uniformly over the surface of the substantially homogeneous mixture formed in the creaming stage. The dough is generally proofed for about 0.5 to about 4.0 hours, although longer and shorter times are possible. The dough may then be sheeted, optionally laminated, then cut and baked. The final moisture content may, for example, be less than about 2.5% by weight.

Cookie Production

The reduced-fat, no-fat, or low-fat cookie doughs or batters of the present invention may be prepared by admixing any shortening or fat with the sugars, flavorings, gums, emulsifiers, and other texturizing ingredients in a conventional upright dough-mixer to obtain a substantially homogeneous mixture. Water, and wheat flour or other flours, may then be admixed with the substantially homogeneous mixture in a second mixing stage. Preservatives and leavening agents may be added in the first or second mixing stage. In embodiments where a humectant is used, it may be conveniently mixed in during the first mixing stage of the dough preparation. The humectant, and at least part of any sucrose which is used, may also be conveniently admixed with the ingredients in a third mixing stage to obtain a substantially homogeneous, pourable batter or dough.

In embodiments of the present invention, the total sugar-solids content, or the texturizing ingredient content, of the cookie doughs, batters, or dough-like mixtures of the present invention may, for example, be at least about 10% by weight, and may, for example, go up to about 50% by weight, based upon the weight of the dough, batter, or dough-like mixture (exclusive of inclusions).

On the basis of 100 pounds of the total amount of flour component in the cookie dough or batter, a humectant, plus any sucrose or other sweetener employed (e.g. artificial sweeteners) in the formulation, may be present in amounts ranging from about 25 to about 175 pounds, depending on the degree of sweetness and humectant properties desired in the baked product.

If flavor chips or fruit pieces are to be added to the cookie dough or batter, they are preferably added, as the last ingredient, to the dough with minimal mixing, so as to avoid smearing of the flavor chips or pieces into the dough or batter.

The doughs or batters are generally prepared at a temperature of less than about 115° F. They may be cooled using ice as a portion of the added water. Solid or liquid carbon dioxide may also be used to cool the dough or batter. Exemplary dough or batter temperatures may range from about 60° F. to about 77° F. Before being shaped or extruded, the dough or batter may be permitted to lay for about 20 minutes to about 120 minutes to hydrate and achieve optimum consistency, in order to control oven spread and to facilitate transfer and forming operations.

The doughs or batters may be shaped or formed into pieces using conventional cookie-dough-forming and shaping-equipment. For example, the doughs may be sheeted between counter-rotating rollers and cut using rotary or reciprocating cutters. They may be formed into pieces by wire-cutting, rotary-molding, enrobing, encrusting, and the like.

In embodiments of the present invention, a calender press, an extruder, or continuous mixer may be utilized to form the dough or dough-like mixture into a continuous rope. Preferably, the screws of the extruder will be co-rotating, i.e., rotating in the same direction. Co-rotating twin-screw elements generally provide thorough mixing and conveying of the components, with the elements of one screw continuously wiping the other screw. This is particularly advantageous when the composition being mixed has a relatively high viscosity.

Suitable extruders which may be used in the present invention include: (1) WENGER model series TX by Wenger of Sabetha, Kansas, (2) model series MPF by Baker Perkins, (3) model series BC by Creusot Loire of Paris, France, and 4) model series ZSK or Continua by Werner and Pfleiderer. Single-screw extruders, including those with a screw that oscillates horizontally during rotation (i.e. a Buss kneader by Buss of Pratteln, Switzerland), may also be used in accordance with the present invention.

A continuous mixer for use in the present invention comprises co-rotating screws and jacketed barrels with heating and/or cooling means. A continuous mixer is similar in construction to a cooker-extruder, except that for the same screw diameter, a continuous mixer has a greater free internal volume and thus operates to mix and convey ingredients at relatively lower pressures and shear than does an extruder, to obtain a substantially homogeneous output. A continuous mixer which may be used is model ZPM-120 by Werner and Pfleiderer.

Filled products may be produced in accordance with the present invention by coextruding the dough, batter, or dough-like mixture with filler materials. The co-extrudate may be formed by the use of a concentric die or a tube inserted within the die orifice. Filled products may also be produced by transporting the dough-like mixture to a conventional enrobing or encrusting machine, such as produced by the Rheon Manufacturing Company, for filling with a filler material. The filled dough pieces may have a weight ratio of the filler to the casing dough within the range from about 0.4–1.6:1.

Examples of fillers which may be used include chocolate-, vanilla-, butterscotch-, fruit-, peanut butter-, and cheese-flavored fillings. The filling material may also be a separately produced dough or batter, for the production of multi-flavored, multi-colored, or multi-textured cookie products. The preferred fillers for use in the present invention are low-fat or fat-free fillers. The fillers may be uncooked or cooked prior to co-extrusion with the doughs of the present invention. Exemplary fillers which may be used are disclosed in U.S. Pat. No. 4,562,080.

The cutting of dough ropes or extrudates before or after baking may be performed by a guillotine-cutter, a band-cutter, fluid-jet cutter, or the like.

The time and temperature of baking are adjusted in accordance with conventional techniques, to provide a shelf-stable moisture content. For example, in crisp variety cookies, the moisture content may be less than about 5% by weight. Soft cookies, cakes and brownies may have higher moisture contents. For example, the soft baked products may have moisture contents of about 5% to 10% by weight or more, based upon the weight of the baked good, inclusive of fillers and inclusions such as flavor chips, raisins and fruit pieces. For example, a fruit-filled, soft, moist cookie or cake may have a moisture content of about 15% by weight or more, based upon the total weight of the cookie. Moisture contents may be determined by first grinding the cookies or other baked product and then using conventional moisture-analysis techniques on the ground sample. Exemplary of such techniques are Brabender (set at 145° C., for 12 minutes) analysis or vacuum-oven (set at 70° C., for 24 hours) analysis, with appropriate correlation. In embodiments of the invention, the reduced-fat, no-fat or low-fat products may exhibit a cookie crumb-like structure, appearance, texture and structural integrity. Starch gelatinization (measured by differential scanning calorimetry) in cookie products of the present invention may be less than about 10%.

The cookie doughs and/or fillers may include antimycotics or preservatives, such as calcium propionate, potassium sorbate, sorbic acid, and the like. Exemplary amounts may range up to about 1% by weight of the dough or filler, to assure microbial shelf-stability. While baking times and temperatures will vary for different dough or batter formulations, oven types, etc., in general, commercial cookie-, brownie- and cake-baking times may range from about 5 minutes to about 15 minutes, and baking temperatures for cookies, brownies, and cakes may range from about 250° F. (121° C.) to about 600° F. (315° C.).

The cookie dough or batter compositions of the present invention may be used for the production of bar-type cookies, drop-type cookies such as chocolate chip cookies, oatmeal cookies, sugar cookies, fruit cookies, sandwich cookies, brownies, and the like.

The present invention is further illustrated in the following examples, where all parts, ratios, and percentages are by weight, and all temperatures are in °F., unless otherwise stated:

EXAMPLE 1

The ingredients and their relative amounts, which may be used to produce a fat-free, fermented cracker dough bakable to an unexpectedly tender texture, are:

| Sponge Ingredients | Parts by Weight |
| --- | --- |
| Wheat flour (about 13% by weight water) | 64 |
| Barley Malt flour (about 10% by weight water) | 0.32 |
| Yeast | 0.1 |
| Starter solution (protease and previous batch starter) | 1 |
| Cracker meal | 2 |
| Water | 30.4 |
| TOTAL | 97.82 |

The sponge is formed by dumping the flours into an upright mixer. The remaining ingredients are added to a mixing tank and blended, then added to the flour in the upright mixer. The mixture in the upright mixer is blended, covered, and fermented or proofed for 17 to 22 hours.

Following this 17–22 hour fermentation, dough-up of the sponge may be effected with the following dough-up ingredients:

| Dough-Up Ingredients | Parts by Weight |
| --- | --- |
| Wheat flour (about 13% by weight water) | 36 |
| Liquid xylanase solution | 0.25 |
| Minor ingredients (salt and sodium bicarbonate) | 1.44 |
| Sodium stearoyl lactylate | 0.50 |
| Fluid unbleached soybean lecithin (acetone-insoluble matter about 62% minimum) | 0.125 |
| Polysorbate 60 | 0.25 |
| Natural flavorant | 0.75 |
| TOTAL | 39.315 |

The xylanase, lecithin, polysorbate 60 and natural flavorant are added to the top of the sponge, then the dough-up flour is added on top of this. The source of xylanase used is PEN #3 liquid concentrate. It has an activity of about 10250±750 XAU per ml and is sold by Quest International Bioproducts Group, 1833 57th Street, Sarasota, Fla. The liquid xylanase solution is prepared by admixing 1 part by weight of PEN #3 liquid concentrate with 9 parts by weight of water. The amount of xylanase added is equivalent to about 1162 XAU/lb flour, based on the manufacturer's colorimetric method as previously described for determining that activity. (XAU means xylanase activity units,) The polysorbate 60 is added as a viscous liquid premix with the natural flavorant. The premix is commercially available as a natural flavor composition from Bush Boake Allen, Chicago, Ill. In addition to the polysorbate 60 carrier, the natural flavor composition includes water, soybean oil, sesame oil, partially hydrogenated corn oil, TBHQ as an antioxidant, and sodium benzoate as a preservative. The premix has a white to off-white color and a fat-like flavor and odor. The sodium stearoyl lactylate is added on top of the dough-up flour, followed by addition of the salt and sodium bicarbonate. The dough is mixed, then proofed for 2–4 hours. The proofed dough is then sheeted, the sheeted dough is laminated, reduced in thickness between counter-rotating reduction rolls, and then cut into pieces using a rotary cutter. The cut pieces are baked to a moisture content of about 2.5% by weight to about 4.0% by weight.

EXAMPLE 2

The ingredients and their relative amounts, which may be used to produce a 35%-reduced-fat, unfermented cracker having an unexpectedly tender texture, are:

| Dough Ingredients | Parts by weight |
|---|---|
| Wheat flour (about 13% by weight water) | 100 |
| Sucrose | 5.55 |
| Soybean oil shortening | 3.00 |
| Whey powder | 3.00 |
| Glucose syrup (43 BE/62 DE) | 1.78 |
| Minor ingredients (salt, butter flavor, amylase, protease) | 2.00 |
| Ammonium bicarbonate | 1.33 |
| Sodium bicarbonate | 0.33 |
| Sodium stearoyl lactylate | 0.50 |
| Fluid unbleached soybean lecithin (as in Example 1) | 0.125 |
| Polysorbate 60 | 0.25 |
| Natural flavorant (as in Example 1) | 0.75 |
| Water | 32.5 |
| TOTAL | 151.115 |

| Topping Ingredients | Parts by weight |
|---|---|
| Salt | 2.38 |
| Shortening (soybean spray oil) | 6.75 |

The dough is formed by first creaming all the dough ingredients except the wheat flour, the amylase, protease, leavening agents, and a portion of the water. The polysorbate 60 and natural flavorant are added as the commercially available premix of Example I. The flour is added to the creamed mixture, then the sodium bicarbonate is sieved on top of the flour, followed by mixing. Then the protease and amylase enzymes and ammonium bicarbonate (each dispersed in a separate portion of the remaining water) are added. The ingredients are mixed, then proofed for 2–4 hours. The proofed dough is then sheeted, laminated, reduced in thickness between counter-rotating rolls, cut into pieces with a rotary cutter, and baked to a moisture content of about 0.5% by weight to about 2.5% by weight. The topping ingredients are then applied, thus obtaining a tender cracker having a 35% reduction in fat content.

EXAMPLES 3–4 AND COMPARATIVE EXAMPLES 1–4

The triple-emulsifier composition of the present invention, as well as emulsifier compositions not containing all three types of emulsifiers, were used to prepare no-fat fermented crackers, in order to evaluate the effect of emulsifiers on cracker hardness. The hardness was evaluated by an expert taste panel. The sponge ingredients and their relative amounts were the same for each of the six different doughs which were prepared. The different emulsifier compositions, as well as different pentosanase levels and salt levels, were used in the dough-up stage. The ingredients and their relative amounts, which were used to produce the sponge for each of the six doughs, were:

| Sponge Ingredients | Parts by Weight |
|---|---|
| Wheat flour (about 13% by weight water) | 64 |
| Barley Malt flour (about 10% by weight water) | 0.30 |
| Yeast | 0.1 |
| Starter solution (protease and previous batch starter) | 0.8 |
| Water | 28.7 |
| TOTAL | 93.9 |

The sponge is formed by dumping the flours into an upright mixer. The remaining ingredients are added to a mixing tank and blended, then added to the flour in the upright mixer. The mixture in the upright mixer is blended, covered, and fermented or proofed for 17 to 22 hours.

Following this 17 to 22-hour fermentation, dough-up of the sponge may be effected with the following dough-up ingredients:

| Dough-Up Ingredients | Parts by Weight | | | | | |
|---|---|---|---|---|---|---|
| | Ex. 3 | Ex. 4 | Comp 1 | Comp 2 | Comp 3 | Comp 4 |
| Wheat flour (about 13% by weight water) | 36 | 36 | 36 | 36 | 36 | 36 |
| Sodium bicarbonate | 1.125 | 1.125 | 1.125 | 1.125 | 1.125 | 1.125 |
| Salt | 0.25 | 0.375 | 0.25 | 0.25 | 0.375 | 0.375 |
| Liquid xylanase solution | 0.25 | 0.10 | 0.25 | 0.10 | 0.25 | 0.10 |
| Sodium stearoyl lactylate | 0.5 | 0.5 | 0 | 0 | 0 | 0.5 |
| Fluid unbleached soybean lecithin (acetone-insoluble matter about 62% minimum) | 0.122 | 0.122 | 1.63 | 0.63 | 1.63 | 1.12 |
| Polysorbate 60 | 0.25 | 0.25 | 0 | 0.25 | 0 | 0 |
| Natural flavorant | 0.75 | 0.75 | 0 | 0.75 | 0 | 0 |
| TOTAL | 39.247 | 39.222 | 39.255 | 39.105 | 39.38 | 39.22 |

The xylanase is added to the top of the sponge, then the dough-up flour is added on top of this. The source of xylanase used is PEN #3 liquid concentrate. It has an activity of about 10250±750 XAU per ml and is sold by Quest International Bioproducts Group, 1833 57th Street, Sarasota, Fla. The liquid xylanase solution is prepared by admixing 1 part by weight of PEN #3 liquid concentrate with 9 parts by weight of water. The amount of xylanase added in the runs using 0.25 lb of liquid xylanase solution is equivalent to about 1162 XAU/lb flour, based on the manufacturer's colorimetric method as previously described for determining that activity. (XAU means xylanase activity units.) The amount of xylanase added in the runs using 0.1 lb of liquid xylanase solution is equivalent to about 465 XAU/lb flour. The sodium stearoyl lactylate, lecithin, polysorbate 60 and natural flavorant are added on top of the dough-up flour, followed by addition of the salt and sodium bicarbonate. The polysorbate 60 is added as a viscous liquid premix with the natural flavorant. The premix is commercially available as a natural flavor composition from Bush Boake Allen, Chicago, Ill. In addition to the polysorbate 60 carrier, this natural flavor composition includes water, soybean oil, sesame oil, partially hydrogenated corn oil, TBHQ as an antioxidant and sodium benzoate as a preservative. The premix has a white to off-white color and a fat-like flavor and odor. The dough is mixed, then proofed for 2–4 hours. The proofed dough is then sheeted, the sheeted dough is laminated, reduced in thickness between counter-rotating reduction rolls, and then cut into pieces using a rotary cutter. The cut pieces are baked to a moisture content of from about 2.5% by weight to about 5.0% by weight.

The results of the expert panel's evaluation of hardness of the crackers are presented in Table 1, by ascending hardness scores:

TABLE 1

| CRACKER HARDNESS AS FUNCTION OF EMULSIFIER COMPOSITION | | | | | | |
|---|---|---|---|---|---|---|
| | Example 3 | Example 4 | Comp Ex. 4 | Comp Ex. 3 | Comp Ex. 2 | Comp Ex. 1 |
| Emulsifier | | | | | | |
| sodium stearoyl lactylate | 0.5 | 0.5 | 0.5 | 0 | 0 | 0 |
| lecithin | 0.122 | 0.122 | 1.12 | 1.63 | 0.63 | 1.63 |
| polysorbate 60 | 0.25 | 0.25 | 0 | 0 | 0.25 | 0 |
| Total emulsifier | 0.872 | 0.872 | 1.62 | 1.63 | 0.88 | 1.63 |
| Natural Flavorant | 0.75 | 0.75 | 0 | 0 | 0.75 | 0 |
| Liquid Xylanase | 0.25 | 0.10 | 0.10 | 0.25 | 0.10 | 0.25 |
| Dough salt | 0.25 | 0.375 | 0.375 | 0.375 | 0.25 | 0.25 |
| Hardness | 51.4 | 52.9 | 57.6 | 58.6 | 58.9 | 61.7 |

As shown in Table 1, the use of the three emulsifier components (sodium stearoyl lactylate, lecithin, and polysorbate 60) in Examples 3 and 4 resulted in unexpectedly low hardness values and an unexpectedly soft texture, compared to the use of: 1) lecithin alone, or 2) lecithin in combination with either sodium stearoyl lactylate or polysorbate 60 in Comparative Examples 1–4. The unexpectedly soft textures were obtained in Examples 3 and 4, even when the total amount of emulsifiers was almost doubled in Comparative Examples 1, 3, and 4.

What is claimed is:

1. A dough for producing a reduced-fat, low-fat or no-fat baked good having at least about 15% ungelatinized starch, the dough comprising flour, water, and an effective amount Of an emulsifier composition for reducing excessive starch gelatinization otherwise resulting from shortening or fat reduction, the moisture content of said dough being less than about 50% by weight, based upon the weight of the dough, and said emulsifier composition comprising: a) at least about 15% by weight of at least one polyoxyethylene sorbitan fatty acid ester, b) at least about 5% by weight of at least one lecithin, and c) at least about 20% by weight of at least one stearoyl lactylate, said weight percentages of emulsifiers adding up to 100% by weight.

2. A dough as claimed in claim 1 wherein said polyoxyethylene sorbitan fatty acid ester is polysorbate 60, said lecithin is fluidized soybean lecithin, and said stearoyl lactylate is sodium stearoyl lactylate.

3. A dough as claimed in claim 1 wherein the fat content of the baked good is less than about 3.33% by weight, based upon the weight of the baked good.

4. A dough as claimed in claim 1 wherein said moisture content is less than about 35% by weight, based upon the weight of the dough.

5. A dough as claimed in claim 1 wherein said dough is a cracker dough having a moisture content of about 27% by weight to about 33% by weight, based upon the weight of the dough.

6. A dough, for producing reduced-fat, low-fat or no-fat crackers, comprising flour, water, and effective amounts of polysorbate 60, lecithin, and sodium stearoyl lactylate, wherein the moisture content of the dough is less than about 50% by weight based upon the weight of the dough, the amount of polysorbate 60 is at least about 15% by weight, the amount of lecithin is at least about 5% by weight, and the amount of sodium stearoyl lactylate is at least about 20% by weight, said percentages of polysorbate 60. lecithin and sodium stearoyl lactylate adding up to 100% by weight.

7. A cracker dough as claimed in claim 6 wherein the amount of polysorbate 60 is from about 20% by weight to about 40% by weight, the amount of lecithin is from about 10% by weight to about 25% by weight, and the amount of sodium stearoyl lactylate is from about 35% by weight to about 70% by weight, said percentages adding up to 100% by weight.

8. A cracker dough as claimed in claim 6, bakeable to a no-fat cracker.

9. A method for producing a reduced-fat, low-fat, or no-fat baked good having at least about 15% ungelatinized starch, the method comprising admixing flour, water, and emulsifiers to form a machinable dough having a moisture content of less than about 50% by weight based upon the weight of the dough, wherein said emulsifiers comprise: a) at least about 15% by weight of at least one polyoxyethylene sorbitan fatty acid ester, b) at least about 5% by weight of at least one lecithin, and c) at least about 20% by weight of at least one stearoyl lactylate, said weight percentages of emulsifiers adding up to 100% by weight, the total amount of said emulsifiers being from about 0.5% by weight to about 1.5% by weight of said flour, forming said dough into pieces, and baking said pieces to obtain a tender texture.

10. A method as claimed in claim 9 wherein said polyoxyethylene sorbitan fatty acid ester is polysorbate 60, said lecithin is fluidized soybean lecithin, and said stearoyl lactylate is sodium stearoyl lactylate.

11. A method as claimed in claim 10 wherein said dough is sheeted, laminated, and then cut into pieces.

12. A method as claimed in claim 10 wherein said dough is formed into pieces by rotary-molding or by wire-cutting.

13. A method for producing reduced-fat, low-fat, or no-fat crackers, comprising admixing flour and water with emulsifiers to form a machinable dough having a moisture content of less than about 50% by weight based upon the weight of the dough, sheeting the dough, forming the dough into pieces, and baking the pieces, wherein said emulsifiers comprise at least about 15% by weight of at least one polyoxyethylene sorbitan fatty acid ester, at least about 5% by weight of at least one lecithin, and at least about 20% by weight of at least one stearoyl lactylate, said weight percentages adding up to 100% by weight, the total amount of said emulsifiers being from about 0.5% by weight to about 1.5% by weight of said flour.

14. A method as claimed in claim 10 wherein said polyoxyethylene sorbitan fatty acid ester is polysorbate 60, said lecithin is fluidized soybean lecithin, and said stearoyl lactylate is sodium stearoyl lactylate.

15. A method as claimed in claim 14 wherein the amount of polysorbate 60 is from about 20% by weight to about 40% by weight, the amount of lecithin is from about 10% by weight to about 25% by weight, and the amount of sodium stearoyl lactylate is from about 35% by weight to about 70% by weight, said percentages of said emulsifiers adding up to 100% by weight.

16. A method as claimed in claim 14 wherein said polysorbate 60, lecithin, and sodium stearoyl lactylate are separately admixed with said flour.

17. A method as claimed in claim 14 wherein a flavorant is admixed with said flour.

18. A method as claimed in claim 14 wherein the polysorbate 60 is premixed with a flavorant.

19. A method as claimed in claim 14 wherein a pentosanase enzyme is admixed with said flour to form said machinable dough.

20. A method as claimed in claim 14 wherein said dough is a fermented dough.

21. A method as claimed in claim 20 wherein said emulsifiers are added in the dough-up stage of producing the fermented dough.

22. A method as claimed in claim 21 wherein a pentosanase enzyme is added in the dough-up stage.

23. A method as claimed in claim 22 wherein the cracker dough is baked to obtain a no-fat cracker.

24. A method as claimed in claim 14, wherein the dough is baked to obtain a low-fat cracker.

25. A method for producing no-fat soda crackers comprising:

(a) admixing flour and water to form a sponge, (b) admixing flour, pentosanase, and effective amounts of emulsifiers comprising at least about 15% by weight polysorbate 60, at least about 5% by weight lecithin, and at least about 20% by weight sodium stearoyl lactylate with said sponge to form a machinable dough having a moisture content of less than about 50% by weight based upon the weight of the dough, said percentages of polysorbate 60, lecithin, and sodium steoroyl lactylate adding up to 100% by weight, (c) sheeting said dough, (d) cutting said sheeted dough into pieces, and (e) baking the pieces.

26. A method as claimed in claim 25 wherein the total amount of the polysorbate 60, lecithin, and sodium stearoyl lactylate is from about 0.5% by weight to about 1.5% by weight, based upon the total amount of the flour used to form the dough.

27. A method as claimed in claim 26 wherein the amount of polysorbate 60 is from about 20% by weight to about 40% by weight, the amount of lecithin is from about 10% by weight to about 25% by weight, and the amount of sodium stearoyl lactylate is from about 35% by weight to about 70% by weight, said percentages adding up to 100% by weight.

28. A method as claimed in claim 27 wherein said dough is rolled into a sheet, and the sheet is laminated upon itself.

* * * * *